United States Patent [19]

Epworth

[11] Patent Number: 4,761,833
[45] Date of Patent: Aug. 2, 1988

[54] OPTICAL FIBRE NETWORK

[75] Inventor: Richard E. Epworth, Bishop's Stortford, Great Britain

[73] Assignee: STC PLC, London, England

[21] Appl. No.: 917,852

[22] Filed: Oct. 14, 1986

[30] Foreign Application Priority Data

Nov. 1, 1985 [GB] United Kingdom ............ 8526942

[51] Int. Cl.⁴ .......................... H04B 9/00; H01J 5/16; G02B 6/34
[52] U.S. Cl. .................... 455/612; 455/610; 250/227; 350/96.19
[58] Field of Search ................ 455/610, 612; 250/227; 350/96.15, 96.16, 96.19

[56] References Cited

U.S. PATENT DOCUMENTS

| | | | |
|---|---|---|---|
| 3,936,631 | 2/1976 | Muska | 250/227 |
| 3,986,020 | 10/1976 | Kogelnik | 455/610 |
| 4,019,051 | 4/1977 | Miller | 350/96.15 |
| 4,086,484 | 4/1978 | Steensma | 250/199 |
| 4,268,116 | 5/1981 | Schmadel et al. | 350/96.19 |
| 4,317,614 | 3/1982 | Palmer | 350/96.16 |
| 4,586,783 | 5/1986 | Campbell et al. | 350/96.15 |

FOREIGN PATENT DOCUMENTS

| | | |
|---|---|---|
| 84/01835 | 5/1984 | PCT Int'l Appl. |
| 1525985 | 8/1978 | United Kingdom . |
| 2019561 | 10/1979 | United Kingdom . |
| 2038017 | 7/1980 | United Kingdom ............ 350/96.15 |
| 2052052 | 1/1981 | United Kingdom . |
| 2083311 | 3/1982 | United Kingdom . |

Primary Examiner—Robert L. Griffin
Assistant Examiner—Andrew J. Telesz, Jr.
Attorney, Agent, or Firm—Lee & Smith

[57] ABSTRACT

An optical fibre network which does not require the fibre (1) to be broken to introduce new terminals (nodes) (3). Information is introduced into the fibre by modulating, particularly by modulating mode coupling, optical power transmitted into the fibre from a source at one or both of its ends. The nodes include tapping means for extracting information. If resonant mode coupling is employed a common grating may be used for introducing and extracting information. Such a non-intrusive network may be overlaid on a conventional local area optical network between two nodes thereof, the fibre being common to both networks. The nodes of the conventional network communicate in one direction along the fibre, whereas the nodes of the non-intrusive network communicate in the opposite direction along the fibre.

8 Claims, 5 Drawing Sheets

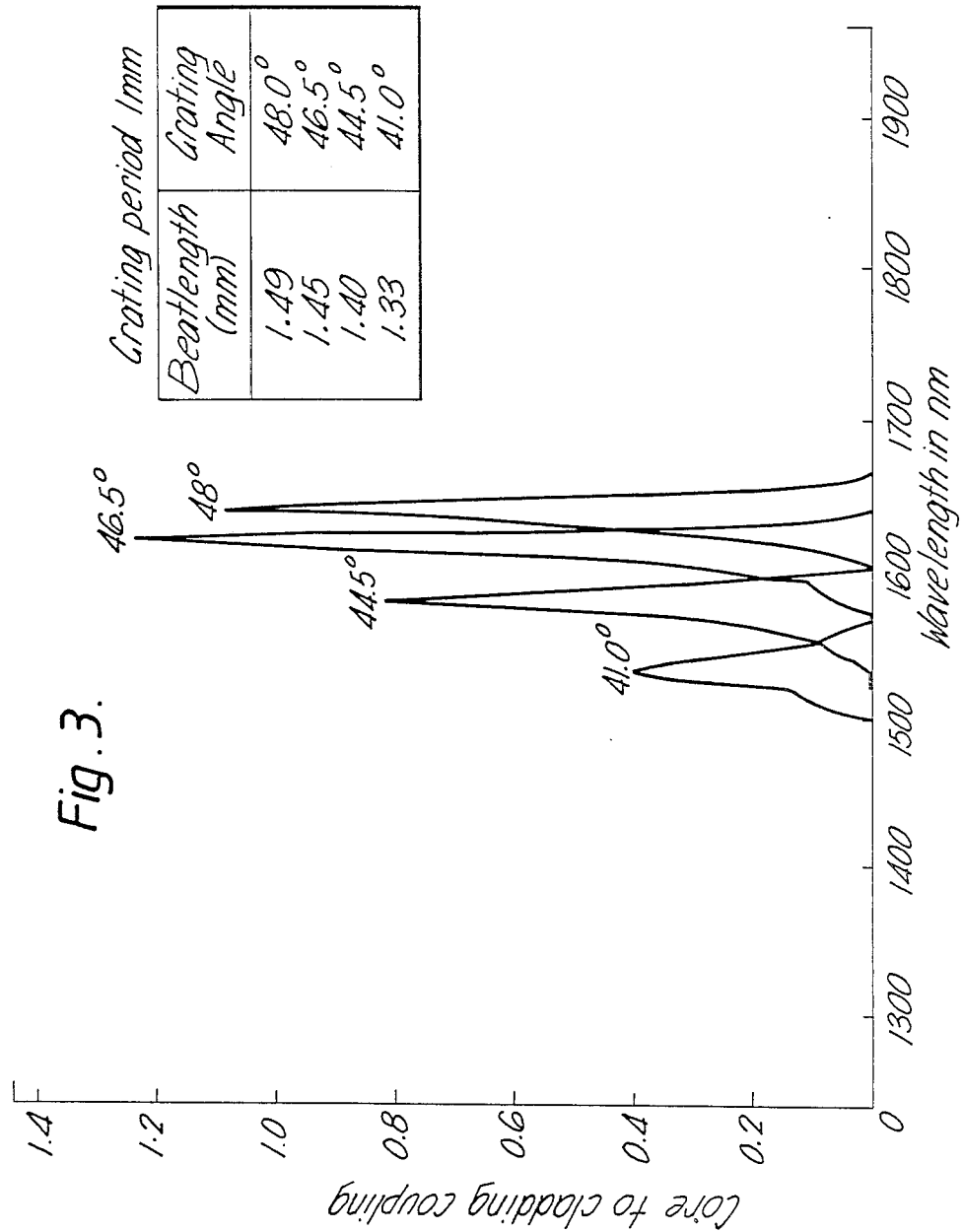

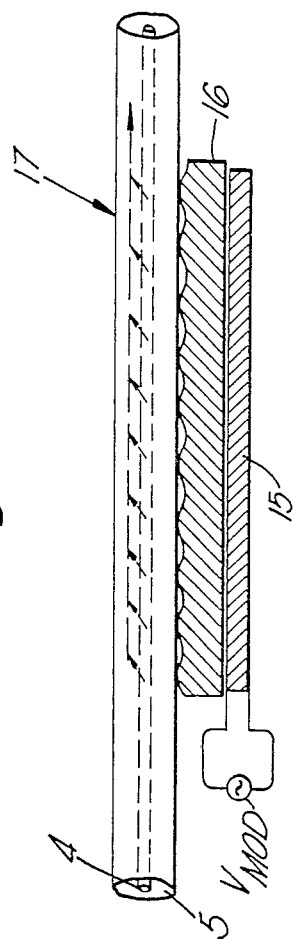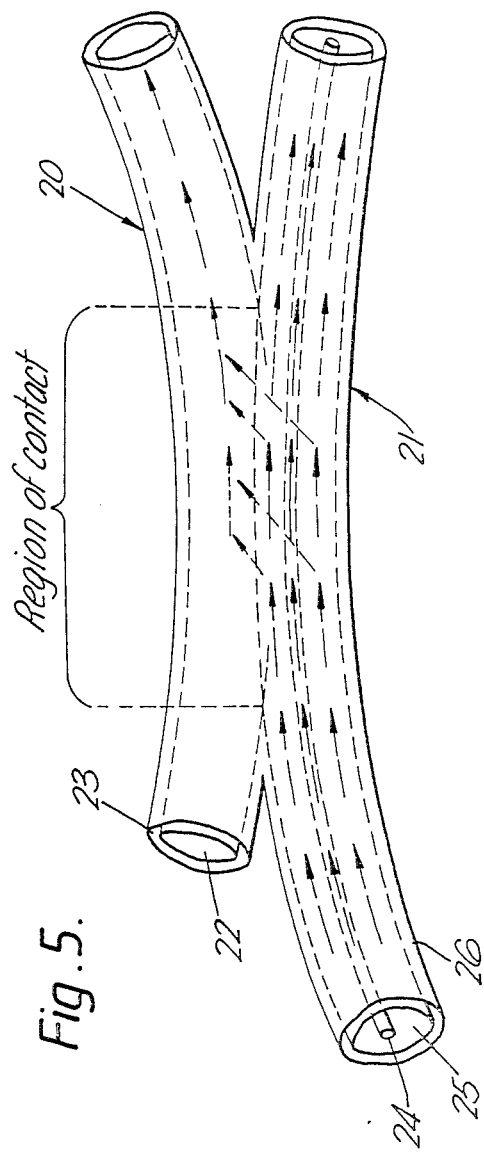

OPTICAL FIBRE NETWORK

BACKGROUND OF THE INVENTION

This invention relates to optical fibre networks.

Optical fibre networks currently available present a considerable number of problems which are not encountered in point to point systems. For example, there are difficulties in introducing new nodes (terminals) and removing old ones without the system being disabled; the number of users is seriously limited by the losses of the nodes or couplers, unless they are active, in which case there are network reliability problems and the nodes are expensive; special receiver designs are required to enable a large dynamic range of received signal levels to be handled, and high capacity per user is difficult to achieve since in a packetised system only modest capacity is available to each user despite the necessity for high bit rate transmission in the network itself.

The growing interest in local area networks (LANs) has raised a new component need, that is for a cheap and convenient means of connecting and disconnecting terminals within multiterminal fibre networks. Generally the techniques proposed so far require the fibre to be broken to insert the terminal. This inevitably means that the network is disabled whilst the change is made. It is of course possible at the time the network is originally installed to splice-in an optical coupler or to introduce an electro-optic terminal at a location where the need for a future terminal is anticipated. However, this is both restrictive and expensive in a system with unpredictable terminal locations. It is also very inefficient in the use of available power. Ideally the installation cost of a multi-user network should be dominated by the number of users at that moment in time, rather than the ultimate capacity. The cheaper the system on the day of installation the better.

SUMMARY OF THE PRESENT INVENTION

According to the present invention there is provided an optical fibre network comprising a length of optical fibre, means for transmitting continuous wave optical power through the fibre from one or both of its ends, and non-instrusive node means associated with the fibre, the node means including transducer means, for introducing information into the fibre by modulating the optical power being transmitted therethrough, and the node means including tapping means for extracting information from the fibre.

BRIEF DESCRIPTION OF THE DRAWINGS

Embodiments of the present invention will now be described with reference to the accompanying drawings, in which

FIG. 3 illustrates resonant coupling versus wavelength for different grating periods;

FIG. 4 illustrates modulatable grating induced coupling of light from the fibre core to the cladding;

FIG. 5 illustrates an embodiment of cladding mode tap;

FIG. 7 illustrates possible uses of the network of FIG. 1a.

DESCRIPTION OF THE PREFERRED EMBODIMENTS

In general a terminal of an optical network is required to both transmit and receive information via the network. An exception is a data collection highway in which data collected by spaced apart sensors is transmitted to one destination over a common fibre, there being a respective data input terminal to the fibre for each sensor.

For the input of information to a fibre it is conventional to couple light in from a modulated light source, one such source being provided at each terminal. However, according to the present invention, and as will be described hereinafter in greater detail, information may be input to an optical network by modulating light already present in the fibre.

The reception (tapping) of information from an optical network by necessity requires some power to be extracted from the fibre. The minimum level of power required by an optical receiver (detector) is, however, usually very small in comparison with the power that can be launched into a fibre from a source. For example 0 dBm could be launched into a fibre from a laser, and −50 dBm might be sufficient power at a subsequent receiver to allow error-free regeneration. The fibre itself will introduce some attenuation, but this may be very low since 10 km of fibre has less than 3 dB loss at 1.55 μm and many networks can be quite small (involve small lengths of fibre). If there were no other losses then there would be sufficient power for many tens of thousands of simultaneous receivers. In practice, however, the vast majority of the power is thrown away at the fibre couplers, either in losses or as excess power coupled to the receiver photodetectors. Conventional fibre network receivers are usually required to have a dynamic range of 30 dB or more. This requirement comes from the inherent inefficiency of the conventional approach, that is sometimes a thousand times too much power falls on the detector. The above comments regarding high loss apply to implementations using star couplers. A ring topology is attractive since it reduces these problems, but it produces a problem of reliability instead. In a ring topology of an optical local area network the terminals are connected by unidirectional transmission facilities to form a structure with a single closed path. Signals placed on the ring pass from terminal to terminal and are generally regenerated as they pass through each terminal.

Figure 1A:
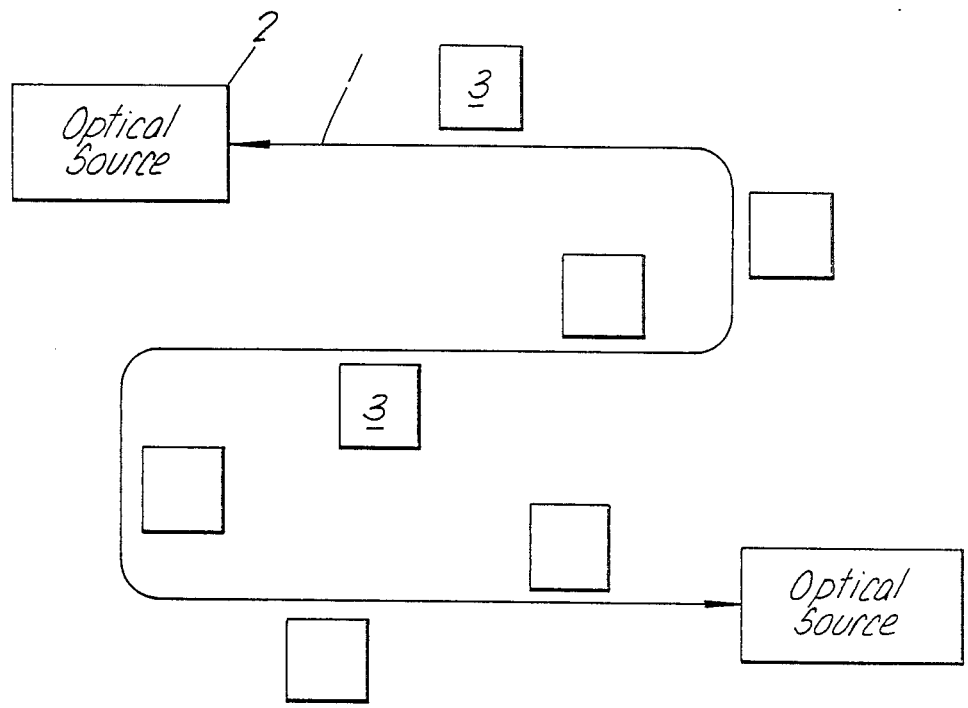
FIG. 1a shows schematically a multi-terminal (node) network employing non-intrusive nodes.
Figure 1B:
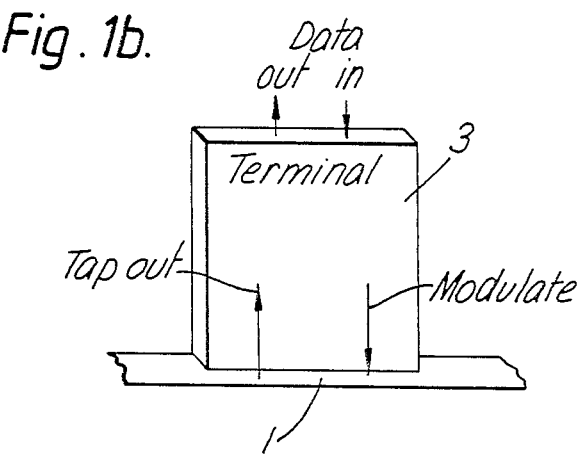
FIG. 1b shows one non-intrusive node on an enlarged scale.

The present invention is based on the use of non-intrusive fibre connections, that is the fibre is not required to be broken in order to introduce a terminal thereinto. FIG. 1a illustrates schematically a multiterminal network using non-intrusive terminals and FIG. 1b illustrates one such terminal schematically and on an enlarged scale. The network comprises an optical fibre 1 which is flooded with continuous wave optical power from one or both ends (as illustrated) such as by optical sources 2. The optical sources are not required to be coherent sources or incoherent. There are a number of non-intrusive terminals 3 along the length of the fibre 1. Each terminal serves to tap out data from the fibre and to input data to the fibre by modulating light already present in the fibre, as indicated schematically in FIG.

1b. A fraction of the light travelling in the fibre may be modulated by modulating a perturbation of the refractive index of the fibre.

When a fibre is sufficiently deformed light is lost from the core of the fibre. For data input, deliberate fibre deformation can be used to modulate the power transmitted by the fibre by modulating the deformation. Therefore deliberate fibre deformation may be used both for modulation (data input) and tapping (data output). By this means information can be injected into the fibre without the need for a local modulated light source at each terminal (transmitter). For data output, deliberate fibre deformation can be used to divert a small portion of the light in the core to an optical receiver. The information is thus introduced into the system fibre by locally modulating the fibre loss. The coupling may be controllable, that is modulated loss is switched in just for the time of modulation.

Examples of the type of fibre and coupling under consideration are as follows. A first example is birefringent fibre with coupling between the two polarisations and removal of one polarisation by a polarisation selective loss. A second example is "two mode" fibre, that is a fibre operating at a wavelength such that a higher order mode can propagate, with coupling from the fundamental mode to a higher order mode. This may then be stripped out, for example by bending. A third example is "single mode" fibre (orthogonally polarised states of the same order mode being considered as a single mode) with coupling from the fundamental mode to a set of cladding modes.

Figure 2:
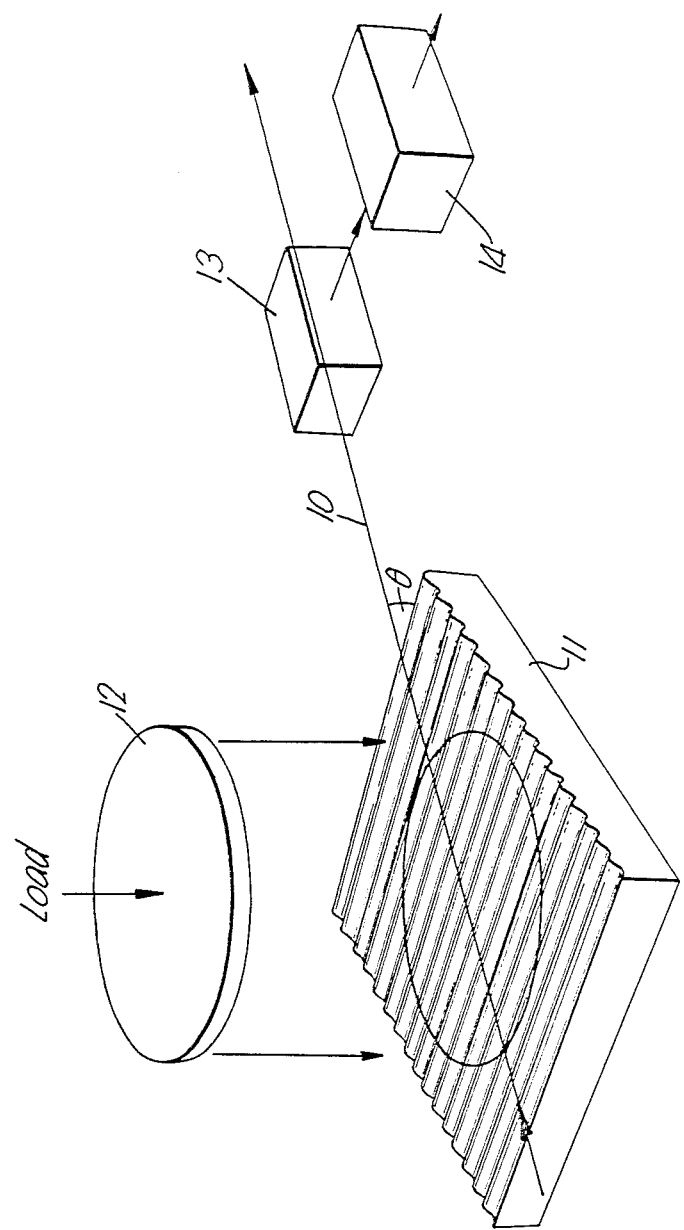
FIG. 2 shows a variable and tunable optical tap.

Light propagating in the core of an optical fibre can be modulated by modulating the pressure applied to a deformed section of a fibre. In its simplest form this deformation may simply be achieved by bending a single mode fibre sufficiently to cause bend loss and by modulating the bend radius. Instead of merely bending the fibre once, a portion of the length of the fibre may be pressed against a mechanical grating, or vice versa, or between a pair of gratings, which grating(s) is/are of the correct wavelength and interaction length to couple together groups of adjacent fibre modes. Such gratings have previously been used in directional couplers and for fibre sensors. Grating coupling has been used extensively with multimode fibre and also for microbend sensors. Coherent mode coupling from a fundamental guided mode in a fibre to an unguided (lossy) mode or modes may be more attractive than simple fibre bending. In coherent mode coupling a grating is pressed against a fibre, the pitch of the grating matching the beat length between the two modes to be coupled. A variable and tunable tap employing this principle is shown in FIG. 2 and was employed in our co-pending GB Application No. 8417663 (Ser. No. 2161609) (R. E. Epworth-S. Wright-R. J. Brambley-D. F. Smith 28-9-2-1) to provide a tunable optical fibre wavelength demultiplexer. In that case the fibre was a single mode fibre. The tap of FIG. 2 comprises a fibre 10 which is deformed by pressing it against a solid grating 11, of uniform pitch, by means indicated as a pressure plate 12 to which a load is applied. The periodic deformation of the optical fibre 10 thus achieved will cause strong coupling between the guided (core) mode and the unguided cladding modes only when the spatial period or pitch of the deformation matches the beat length between the guided mode and the cladding modes. Coupling occurs between the guided mode and the cladding modes only at the optical frequency at which the inter-mode beat length matches the pitch of the fibre deformation. Such resonant coupling of the light out of the core thus only occurs at the optical wavelength to which the device is tuned. In FIG. 2 a cladding mode tap 13 extracts the cladding light which is then detected by a photodetector 14. FIG. 3 shows the experimental results obtained for a fixed value of load L applied to the grating. The wavelength selectivity of this approach is clearly apparent from FIG. 3.

In FIG. 4 there is indicated a fibre 17 having a core 4 and cladding 5. Modulation of the power in the fibre core 4 may be achieved by employing a wideband piezoelectric transducer 15 to press a grating 16 against the fibre 17, with the grating modulated at signal frequencies, wavelength selective modulation is achieved. Instead of a mechanical grating a periodic grating may be generated by a travelling acoustic wave excited by an electro-acoustic transducer. As mentioned above, the coupling may be controllable. The normal situation might be one in which a preload on the grating introduces a loss of say 0.5%, and when the modulation is applied to the grating the loss might swing between 0 and 1%, thus inducing a maximum of 1% peak to peak modulation. Control of the preload would enable lower initial loss values to be used without the need to correspondingly reduce the modulation depth. The dynamic control of the preload may be achieved by simply applying a step drive to the modulating transducer or by a secondary load transducer.

It should be noted that in graded index multimode fibre the pitch required to produce efficient coupling is that which matches the oscillating ray path in the core. The pitch required for coupling (i.e. the beat length) in graded index multimode fibre does not vary with wavelength and so cannot be used to achieve wavelength selectivity.

The modulation described above is amplitude modulation and has the advantage that it may be demodulated by a simple photodetector. In alternative arrangements of non-intrusive networks, frequency or phase modulation could be used, however the detection arrangement required would be slightly more complex. An interferometer could be used to convert the FM or PM to AM at each receiver. In this case the light would need to be coherent over the interferometer delay time.

There are various techniques by which light may be tapped from a fibre without breaking it. The objective is to tap a small fraction of the transmitted power without significant loss of power in the fibre being tapped. Preferably the tapped fraction should be presetable or controllable, for example, electronically, to any value between 0 and 100%. It is not easy to tap light from a continuous low loss fibre as the fibre is designed to minimise any possible loss mechanisms. One proposed method comprises extracting the light in two stages. In a first stage light is coupled from a strongly guided mode in the core to another mode of the guide which may be more easily accessed. In a second stage this light is coupled to a second fibre. The first stage may be achieved by bending, or pressing a grating against a single mode fibre, sufficiently to cause bend loss either in the same or similar device to that used for modulation. The grating may be the same one as used for modulation. However the light lost from the core will be guided by the cladding provided that the cladding is surrounded by a material of lower refractive index. Generally this is the case as the fibre is usually protected by a silicone primary coating. Once the light is in the cladding it may however be extracted by some kind of cladding mode tap. In FIG. 5 a cladding mode tap comprises a tap fibre 20 and a main network fibre 21. The tap fibre 20 has a silica core 22 and silicone cladding 23. The network fibre 21 has a silica core 24, silica cladding 25 and a silicone cladding coating 26. In the region of contact of fibres 20 and 21 the silicone claddings 23 and 26 are not present. Thus light coupled from the core 24 to cladding 25 of fibre 21 can be coupled to the core of the tap fibre 20, as indicated by the arrows. If a grating coupling is used such that cladding-mode tap will be wavelength selective. The tap may use an intermediate length of fibre as described above or may couple directly to a photodetector by means of a short plastic "guide". The tapped fraction for the receiver might also be controlled in a similar way to that mentioned above for modulation, hence unused terminals may be made lossless. This control could also be used for optical AGC.

Figure 6:
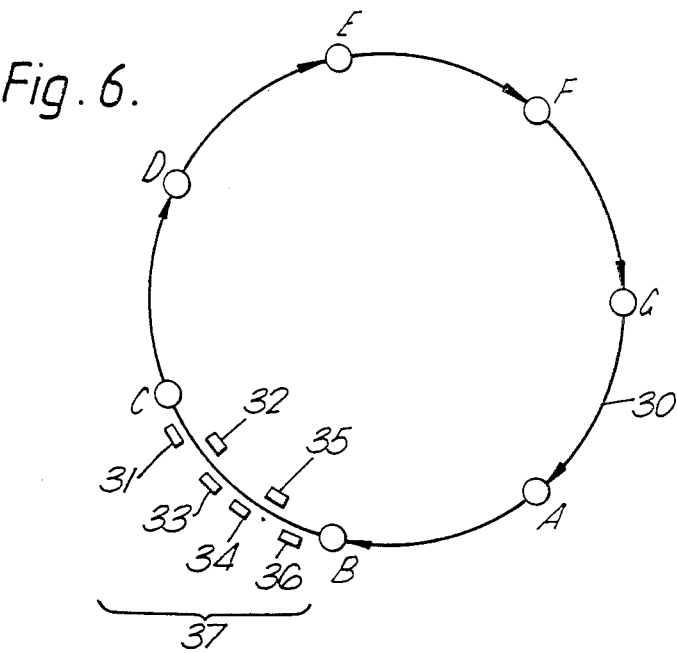
FIG. 6 illustrates a network of the FIG. 1a type overlaid on a conventional LAN interconnection.

As coherent mode coupling (resonant mode coupling) only occurs when the grating is tuned to the same pitch as the fibre beat length, as shown in FIG. 4, a conventional fibre transmission may be overlaid on the same fibre. This is illustrated schematically in FIG. 6. A conventional ring topology LAN comprises terminals A to G connected by a fibre path 30 with the arrows indicating the direction of transmission around the ring. A non-intrusive network 37 as described above is located between terminals C and B and include non-intrusive terminals 31 to 36 coupled to the fibre 30 between C and B. If the continuous wave light source required for the non-intrusive network is located at C, then the non-intrusive network communicates in the anti-clockwise direction and the conventional LAN provides the return path.

The continuous wave optical source may be modulated as a means of transmitting information to one or any of the non-intrusive node means (receiver parts thereof). In the case of an overlaid system as referred to in the preceding paragraph, this is presently considered the best way for the conventional network nodes to communicate downstream, that is there is no need to acoustically modulate if there is access to the source.

The tunable nature of the taps and modulators means that the various terminals on the non-intrusive network may be distinguished. However this requires tight control of the fibre mode structure, that is determined by the refractive index profile.

An alternative means of resolving different terminals on the non-intrusive network is via the modulation waveform. Digital coding could be used but FDM (i.e. different modulation carriers for each terminal) has the advantage of only requiring the frequency response to be flat over the information bandwidth. This may make it easier to avoid unwanted resonances in the modulating transducer structure.

Figure 7:
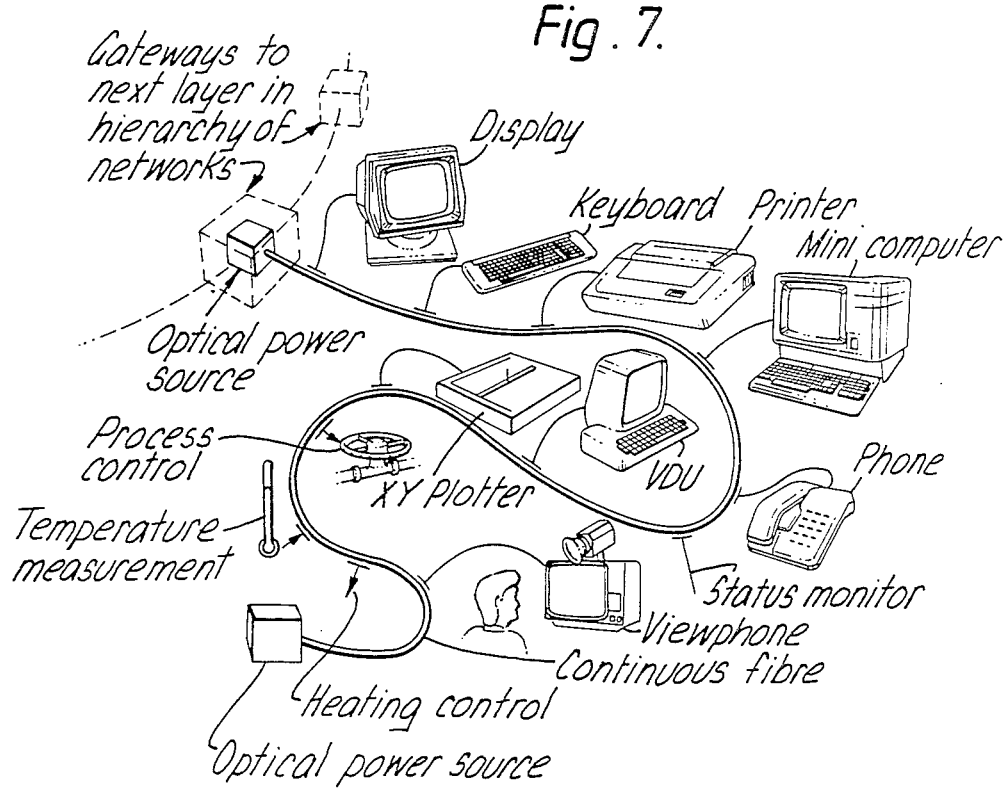

Instead of overlaying an non-intrusive network on a conventional LAN, it may be connected to a conventional network via gateways as indicated in FIG. 7, which also indicates examples of different elements which can be coupled to such a non-intrusive network.

The non-intrusive network of the present invention is a "continuous" fibre fed with power optically from one or both ends, which power is modulated with information locally, such as by amplitude modulation as a result of grating deformation of the fibre, and thus without the need to break the fibre. Information is tapped out by extracting light using similar techniques to that used for modulation. Since the fibre does not need to be broken to introduce terminals, the terminals can be located anywhere along its length and applied and disconnected as desired. For resonant mode coupling the fibre must support two modes, at least, at the grating. This narrow band coupling at the grating enables overlay on a conventional network.

I claim:

1. An optical fiber network comprising a length of single mode optical fiber having a core and cladding thereon, means for transmitting continuous wave optical power through the fiber from one or both of its ends, and non-intrusive node means associated with the fiber, the node means including transducer means, for introducing information into the fiber by modulating the optical power being transmitted therethrough, and the node means including tapping means for extracting information from the fiber, wherein the transducer means and the tapping means involve periodic gratings and are such as to provide wavelength dependent resonant mode coupling between the guided mode in the core and a mode or modes in the cladding of the optical fiber whereby the modulation and tapping at the node means is wavelength selective, information being introduced into and extracted from the optical fiber at the node means by said mode coupling.

2. A network as claimed in claim 1, wherein the periodic gratings are provided by mechanical gratings.

3. A network as claimed in claim 1, wherein the periodic gratings are acoustically induced, travelling wave or standing wave, gratings.

4. A network as claimed in claim 1 wherein the modulation involves locally modulating the fibre loss.

5. A network as claimed in claim 1, wherein at least one mode means includes one said transducer and one said tapping means combined in a common structure, and wherein a common grating is used for modulation and tapping in said at least one node means.

6. A network as claimed in claim 1, wherein the modulation involves locally modulating the fibre loss and wherein the coupling is controllable whereby the loss is modulated only for the time of modulation.

7. An optical fibre network as claimed in claim 1, wherein the continuous wave optical power is generated by an optical source which is modulated whereby to transmit information to one or more of said non-intrusive node means.

8. An optical fiber network as claimed in claim 1 overlaid on a second optical fiber network composed of optical fiber the same as the optical fiber of said first fiber network, and having respective node means and including means whereby optical power modulated with information is injected at each of the node means of the second optical fiber network and transmitted in a first direction therebetween, the first-mentioned length of optical fiber simultaneously comprising a length of optical fiber of the second optical fiber network disposed between two of the node means of the second optical fiber network, and wherein the information injected at the node means of the second network is transmitted in the first direction along the first-mentioned length of optical fiber and the information introduced in the first-mentioned length of optical fiber at the non-intrusive node means by node coupling is transmitted in the opposite direction to the first direction along the first-mentioned length of optical fiber.

* * * * *